June 18, 1929.  T. H. FISHER  1,717,501
VIBRATOR
Filed Dec. 17, 1924
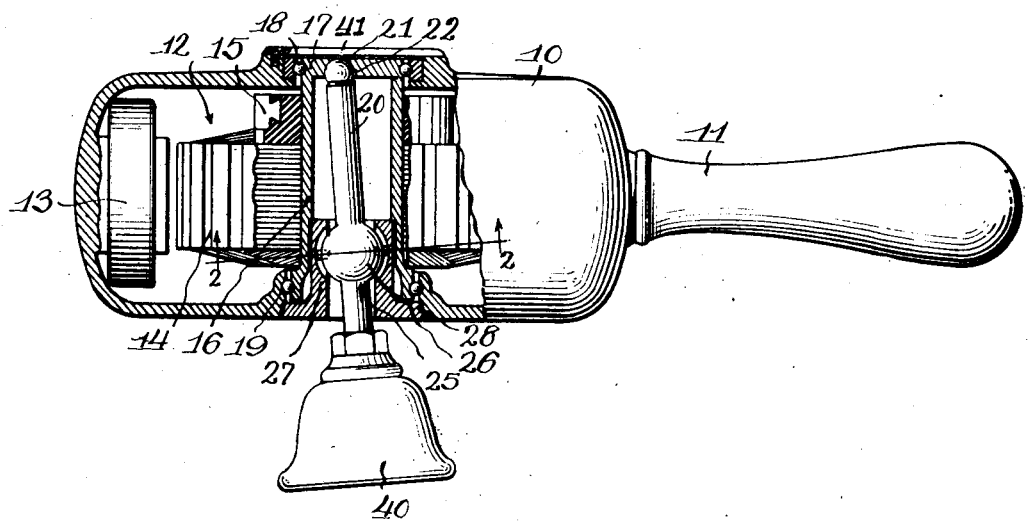
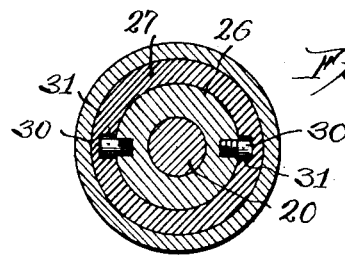
Witness  
Inventor  
Thomas H. Fisher Patented June 18, 1929.

1,717,501

UNITED STATES PATENT OFFICE.

THOMAS H. FISHER, OF WINNETKA, ILLINOIS.

VIBRATOR.

Application filed December 17, 1924. Serial No. 756,487.

This invention relates to electrically operated vibrators and has for its principal object to produce a simple, efficient and durable device of the class described in which the axial dimensions of the device may be reduced to a minimum commensurate with the size of the electric motor utilized therein.

As heretofore constructed electric vibrators of relatively light type adapted for manual use have had as their main elements a small electric motor and an eccentric oscillating member operatively connected at one end of the motor armature. This arrangement of the motor armature and oscillator member in alinement with each other requires a relatively long casing and consequently provides a more or less cumbersome and unwieldy device when being manipulated by hand.

In the present invention I overcome these disadvantages by providing a hollow armature having the oscillator member housed within the armature and thereby reducing the necessary axial length of the entire device. My invention may best be understood by reference to the accompanying drawings, in which Figure 1 is a view in part longitudinal section of a vibrator constructed in accordance with my invention.

Figure 2 is an enlarged sectional view taken on line 2—2 of Figure 1.

Referring now to details of the invention illustrated in the drawings, the vibrator is provided with a main casing 10 and a handle 11. A rotary electric motor 12 within the casing comprises the usual type of field winding 13 and armature 14 having a commutator 15. The center portion of the armature comprises a hollow tube 16 closed at one end by a plate 17 which in the form shown is made integral with the tube 16. The entire armature and tube 16 are afforded suitable bearing in the casing, as for instance by ball bearings 18 and 19 at opposite sides of the casing.

The oscillator device is housed substantially within the hollow portion of the armature and comprises an oscillating shaft 20 having its upper end 21 engaging in a hole 22 arranged eccentrically of the end plate 17. The other end of the shaft is secured in place by a ball and socket joint indicated generally at 25 adjacent the opposite end of the tube 16. This ball and socket joint comprises a ball 26 on the shaft 20 fitting in a socket member 27. Said socket is connected by suitable means to the casing 10 as for instance, it may have an end portion 28 threaded in said casing, said end plate effectively closing the open end of the tube 16 and the casing.

In order to prevent rotation of the shaft 20, a pair of pins 30, 30 are provided on opposite sides of the ball 26, these pins fitting in slots 31, 31 on opposite sides of the socket member 27. An applicator device may be detachably connected in the usual manner to the outer end of the shaft 20. In the form shown, a rubber cup 40 is used. A cover plate 41 encloses the upper end of the casing. The electric wires are not shown, as they may be arranged in any suitable manner for connection with the motor.

A vibrator device constructed as above described, is manifestly of simple construction with a minimum number of moving parts and requiring a minimum longitudinal space substantially controlled by the longitudinal length of the motor employed. With these advantages, it is particularly adapted for manual use being relatively light and well balanced for the purpose to which it is usually applied.

I claim as my invention:

1. In a vibrator, a motor having a hollow armature carrying windings thereabout, a vibrator shaft within said armature and windings, and connected eccentrically adjacent one end thereof and supported for vibratory movement adjacent the other end of said armature.

2. In a vibrator, the combination of a motor having a hollow armature, and a gyrating shaft extending longitudinally of said armature and from one end thereof, said shaft having bearing adjacent its projecting end at a point coaxial with said armature and having bearing at the other end of said armature eccentrically with respect to the axis thereof.

3. In a vibrator, a motor casing and a motor therein, the motor having an armature provided with a hollow sleeve arranged longitudinally thereof and having bearings at opposite ends in said motor casing, and a gyrating member having bearing within the longitudinal limits of said hollow sleeve at points spaced longitudinally of said sleeve and offset with respect to each other.

4. In a vibrator, a motor casing and a motor therein, the motor having an armature provided with a hollow sleeve arranged longitudinally thereof and having bearings at opposite ends in said motor casing, and a gyrating member having bearing within the longitudinal limits of said hollow sleeve at points spaced longitudinally of said sleeve, one of said bearing points being radially offset from and the other being coincident with, the axis of said armature.

Signed at Chicago, Ill., this 12th day of December, 1924.

THOMAS H. FISHER.